Nov. 9, 1926.
C. CARSON
1,606,511
LUBRICATING DEVICE
Filed Oct. 20, 1923
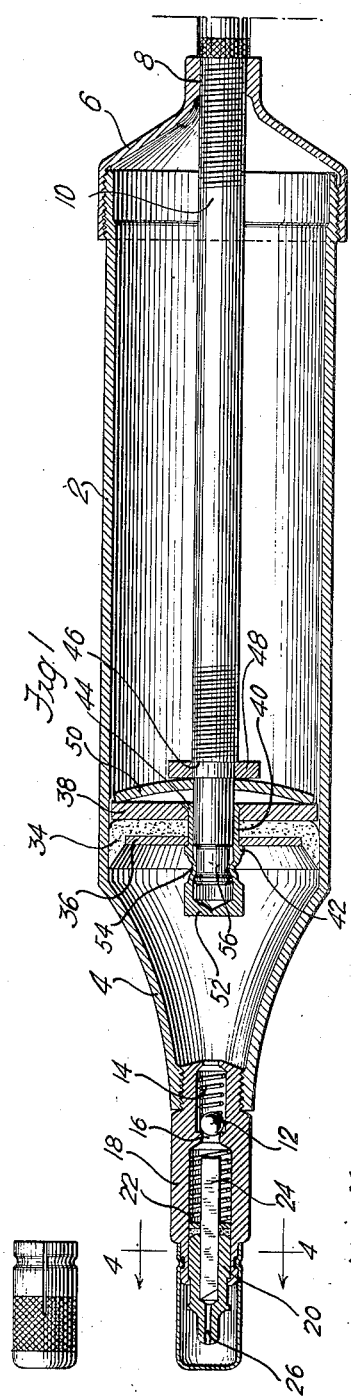
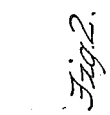
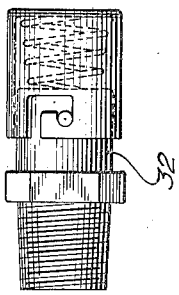
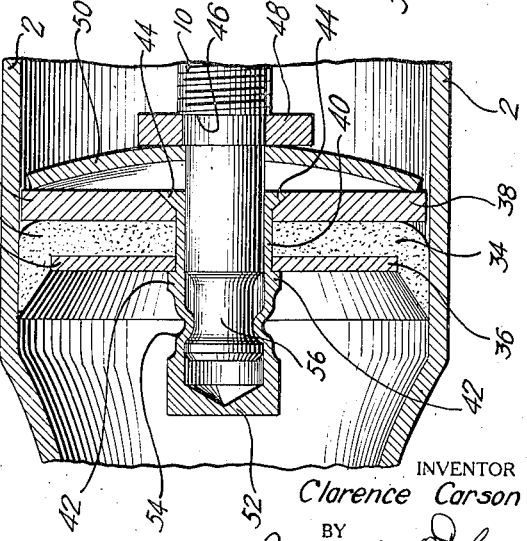
INVENTOR
Clarence Carson
BY
ATTORNEYS Patented Nov. 9, 1926.

1,606,511

UNITED STATES PATENT OFFICE.

CLARENCE CARSON, OF DETROIT, MICHIGAN, ASSIGNOR, BY MESNE ASSIGNMENTS, TO DODGE BROTHERS INC., A CORPORATION OF MARYLAND.

LUBRICATING DEVICE.

Application filed October 20, 1923. Serial No. 669,872.

This invention relates to lubricating devices of the type in which the lubricant is put under pressure before the device is connected with the part to be lubricated and in which provision is made for opening a valve communicating with the chamber in which the lubricant is stored under pressure after proper connection has been made with the conduit or channel into which the lubricant is to be discharged.

In devices of this type as heretofore designed difficulty has been experienced in maintaining the proper tightness in the joints between the relatively movable parts to prevent leakage of the lubricant past the confining means when under pressure. In a well known form of lubricating device of this general type, the lubricant is contained in a cylindrical barrel or chamber having a piston movable lengthwise thereof, the movement of said piston being effected by means of a screwthreaded rod having both a swivel and a sliding connection with said piston and adapted to be screwed through the end of the barrel, the lubricant being confined under pressure between said piston and a valve communicating with a discharge nozzle having a tripping device arranged to open said valve to permit the discharge of the lubricant.

Difficulty has been experienced in lubricating devices of this type in maintaining a tight joint between the piston and the piston rod at the swivel and sliding connection between the piston and its rod. This difficulty has been aggravated by the fact that in lubricating devices of the stored pressure type the connection between the piston and its rod is not a simple swivel, provision being made in this connection for a limited movement of the piston lengthwise of the rod against a spring in which the pressure put upon the lubricant is stored.

A particular object of the present invention is to provide a connection between the piston and its propelling rod in a device of this general type which will permit the piston to swivel on the rod and will also permit a lengthwise movement of the piston upon the rod, but which nevertheless will be absolutely fluid tight so that lubricant under pressure cannot escape past the piston at this joint.

Another object of the invention is to facilitate the positioning of the lubricating device in communication with the lubricant conveying conduit or channel in the part to be lubricated.

Other objects and important features of the invention will appear from the following description and claims when considered in connection with the accompanying drawings, in which—

Fig. 1 is a longitudinal section through a lubricating device embodying the present invention, the handle end of the piston operating rod being shown in Fig. 2 for convenience in illustration;

Fig. 3 is an enlarged section through the piston showing the details of its connection to the piston operating rod;

Fig. 4 is a section on the line 4—4 of Fig. 1;

Fig. 5 is a longitudinal section through a nipple adapted to cooperate with the nozzle of the lubricating device to form a lubricant tight connection when a part to which the nipple is conected is to be lubricated;

Fig. 6 shows the nipple provided with a protecting cap; and

Fig. 7 is a detail view of the nozzle protecting cap.

The illustrated lubricating device, or "grease gun", comprises the lubricant containing barrel 2 having a tapered end 4 to which the nozzle and valve mechanism are connected and provided at its other end with a cap 6 threaded upon said barrel 2 and having a threaded opening 8 through which the threaded piston rod 10 is screwed to effect the movement of the piston lengthwise of the barrel.

The valve operating mechanism does not specifically constitute a part of the present invention. The valve comprises a ball 12 pressed by a spring 14 against a valve seat at the inner end of an opening 16 in a nipple 18 having at one end a chamber for the spring 14 and ball 12 and at the other end a chamber in which the nozzle 20 is slidable, the nozzle 20 being normally pressed to its outermost position by a spring 22.

Carried by the nozzle 20 is a rod 24 adapted to engage the valve 12 and unseat it from its seat to permit the lubricant to pass by this valve and through the opening 26 in the nozzle, the lubricant having previously been placed under pressure. The end of the nozzle 26 is preferably convex and is adapted to cooperate with a concavity 28 surrounding the lubricant conduit 30 in the nipple 32 which is connected with the part to be lubricated. Insertion of the convex end of the nozzle 20 in the concavity 28 of the nipple 32 automatically centers the nozzle 20 so that its opening 26 is directly in communication with the opening 30 in the nipple 32 whereby the lubricant discharged from the lubricating device through the nozzle 20 is forced under pressure through the conduit 30 into the part to be lubricated.

As hereinabove suggested, an important feature of the present invention is the lubricant-tight construction of the piston by which pressure is put upon the lubricant. The illustrated piston comprises a cupped disk 34 of leather or other suitable packing material, preferably bevelled, as shown, upon its outer edge, this disk being confined between a disk or washer 36 fitting within the cupped portion and another disk or washer 38 serving as a backing for the flexible disk 34, the disk or washer 38 approximating in diameter the inner diameter of the barrel 2. The disks 36 and 38 are confined upon a sleeve 40 between a shoulder 42 on this sleeve and an out-turned flange 44 formed by upsetting the end of the sleeve into a countersink in the disk or washer 38.

The sleeve 40 is adapted to slide lengthwise upon the rod 10, the part of the rod upon which the sleeve moves being preferably not threaded and being preferably reduced somewhat in diameter from the threaded portion to provide a shoulder 46 against which the stop washer 48 abuts.

The purpose of the movement of the sleeve 40 with the connected piston lengthwise of the rod 10 is to provide for putting under tension a spring 50, which, in the illustrated construction, preferably comprises a steel washer bent about one diameter, this tensioning of the spring 50, when the piston has pressed the lubricant against the valve 12 and the rod 10 is further moved into the barrel, serving to store up pressure which will operate to force the piston forward and eject the lubricant with considerable force through the nozzle opening 26 when the valve 12 has been opened.

To make the sliding and rotating joint between the rod 10 and the sleeve 40 absolutely lubricant-tight, this sleeve is preferably closed upon the lubricant side of the piston as shown at 52, so that this end of the rod 10 is completely enclosed. Moreover, in order to limit the movement of the sleeve upon the rod, the sleeve is preferably provided with an annular indentation 54 fitting into an annular recess 56 on the rod 10, the recess 56 extending along the rod sufficiently to provide for the desired movement of the sleeve lengthwise of the rod.

From the foregoing description it will be seen that the swivel and sliding connection between the rod 10 and the piston is completely sealed so far as access thereto of lubricant is concerned from the lubricant side of the piston and that none of the lubricant can be forced under pressure through this joint to the spring side of the piston.

What is claimed as new is:

1. In a piston construction for grease guns, a piston rod formed with a reduced portion adjacent one end, a piston head, means for slidably mounting said piston head upon said piston rod, said means comprising a sleeve on which the piston head is rigidly carried, said sleeve having a closed end enclosing that end of the piston rod adjacent which the reduced portion is formed, and an inwardly projecting annular indentation formed in said sleeve to provide an annular bead occupying a position within the reduced portion of the piston rod to limit the sliding movement of the piston head relative to the piston rod.

2. In a piston construction for grease guns, a piston rod, a piston head, a sleeve having a closed end enclosing one end of said piston rod, a plurality of annular shoulders formed on said sleeve and forming means between which the piston head is rigidly secured to the sleeve, an elongated reduced portion formed in said piston rod adjacent that end thereof which normally occupies a position in said sleeve, and means comprising an integral annular bead portion formed in said sleeve and occupying a position within the reduced portion of the piston rod to limit the sliding movement of the piston head relative to the piston rod.

Signed at Detroit, Michigan, this 17th day of October, 1923.

CLARENCE CARSON.